C. F. RENARD.
ELASTIC WHEEL.
APPLICATION FILED JULY 28, 1908.

954,004.

Patented Apr. 5, 1910.
3 SHEETS—SHEET 1.

WITNESSES:

INVENTOR
Charles François Renard

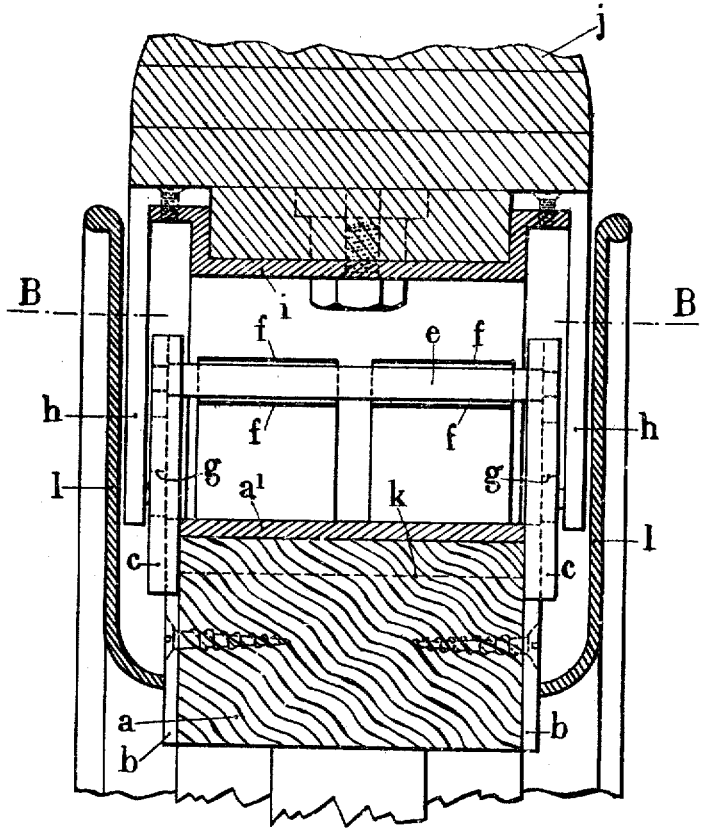
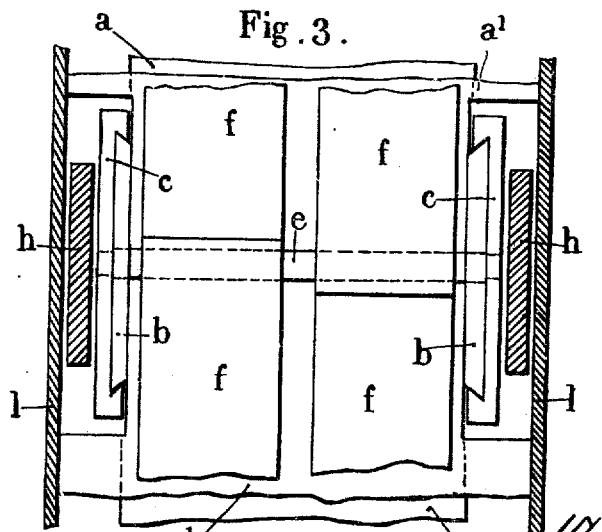

C. F. RENARD.
ELASTIC WHEEL.
APPLICATION FILED JULY 28, 1908.

954,004.

Patented Apr. 5, 1910.
3 SHEETS—SHEET 3.

WITNESSES
W. P. Burke
A. F. Heuman

INVENTOR
Charles Francois Renard
BY Wallace White

UNITED STATES PATENT OFFICE.

CHARLES FRANÇOIS RENARD, OF PARIS, FRANCE.

ELASTIC WHEEL.

954,004.  Specification of Letters Patent.  Patented Apr. 5, 1910.

Application filed July 28, 1908. Serial No. 445,836.

*To all whom it may concern:*

Be it known that I, CHARLES FRANÇOIS RENARD, of 390 Rue Saint-Honoré, in the city of Paris, Republic of France, engineer, have invented an Elastic Wheel, of which the following is a full, clear, and exact description.

This invention relates to an elastic wheel in which a circle distributing the strains is connected with the rim by means of tappets, rollers, slides and studs, the whole being supported by springs. Furthermore, a device comprising rollers connected with the circle by the tappets and slots acting as cams provided in slides connected with the wheel and receiving the rollers, is used to cause the tire to be carried along with the rim of the wheel and this in a progressive manner.

Figure 1:
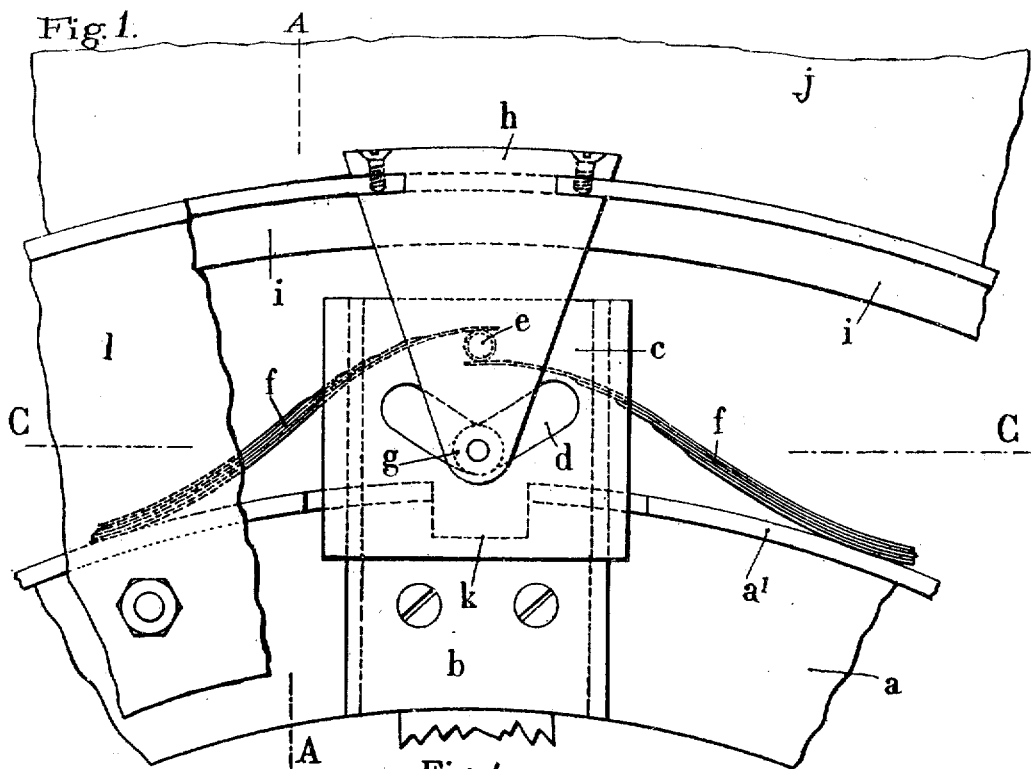
Figure 4:
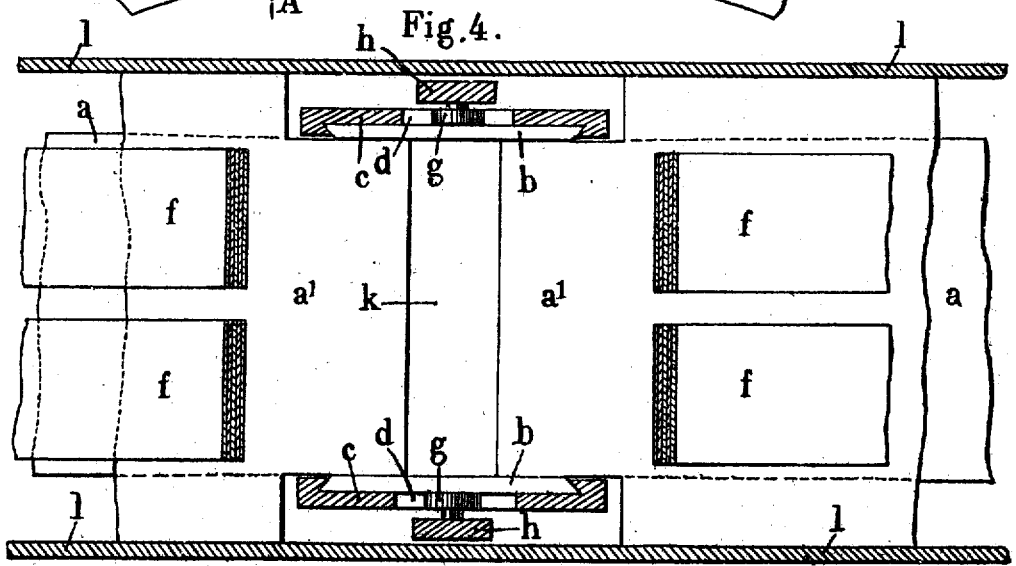
Figure 5:
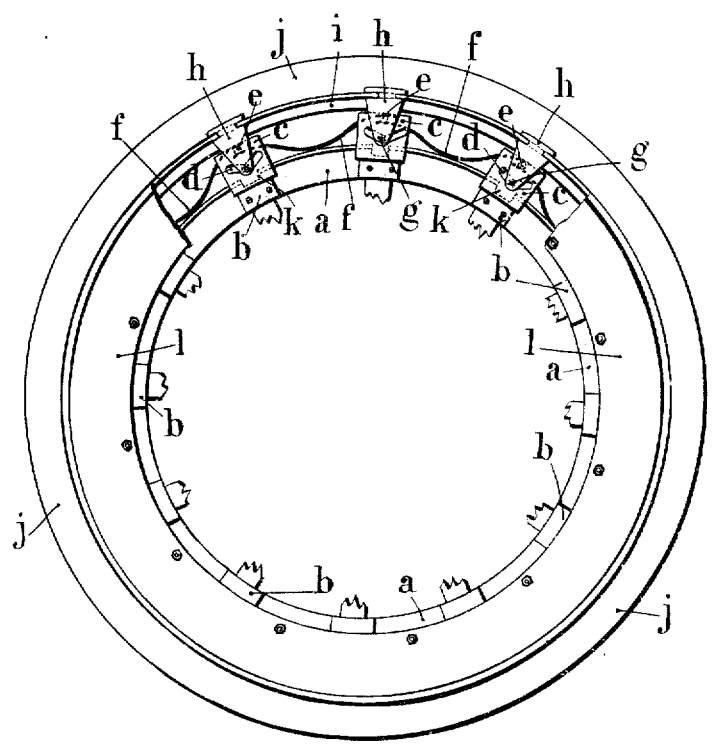

This invention will be hereinafter described with reference to the accompanying drawing in which:

Figure 1 shows in front view a portion of this wheel. Fig. 2 is a cross section made according to line A—A of Fig. 1. Fig. 3 is a horizontal section made according to line B—B of Fig. 2. Fig. 4 is a horizontal section made according to line C—C of Fig. 1. Fig. 5 shows the whole of this wheel in front view.

As shown in this drawing, on both sides of the wooden rim $a$ are fixed studs $b$ which have a dovetailed shape in cross section. These studs receive slides $c$ provided with a slot having a double incline $d$ acting as a cam. Two of these slides arranged the one in front of the other in the transverse direction of the wheel are connected together by means of ties $e$ so as to constitute a tire supporting member. For this, these members are each supported by means of springs $f$ one of these springs being engaged under the cross tie $e$ while the other bears against the other tie.

The slots $d$ provided in the slides receive each a roller $g$ mounted on a tappet $h$ connected with the internal ring $i$ which can thus be brought nearer to the center of the wheel or be removed therefrom according to the direction of the strains exerted in stretching the supporting springs. Furthermore, the arrangement of the inclines in the slots $d$ provided in the slides $c$ connected with the wooden rim $a$ insures the carrying along of the circle $i$ in a progressive manner either in one direction or in the other. The india-rubber tire $c$ is secured on the circle $i$ in any suitable manner.

Notches $k$ provided in the wooden rim $a$ and in the iron ring $a'$ receive the cross ties $e$ as well as the end of the springs $f$ as the extreme flexures of the ring $i$ take place.

When the ring $i$ yields at the lower part, the tappets, the rollers, the slides and the cross tie corresponding to this point then cause the end of the springs $f$ arranged on the inner side to yield. Upon the side which is diametrically opposed to the said strain, the ring $i$ on being lifted carries along the corresponding members and their cross-tie $e$ lifts the nose of the springs $f$ which are toward the periphery of the wheel. As an example, a strain may be exerted and transmitted over two diametrically opposed points but it is well understood that the said initial strain will be distributed in virtue of the internal ring over all the elements arranged around the wheel.

Cheeks $l$ bolted upon the wooden rim cover the suspending members while allowing them to play freely.

Claim:

An electric wheel comprising a rim, a plurality of slides on each side of the rim having radial movement, a cross tie carried by the opposing slides, each of said slides having an angular notch thereon, a series of leaf springs carried by the rim and having their ends engaging with the cross ties, and an outer rim carrying a plurality of tappets projecting inwardly, and a roller on each tappet engaging in the slot in the slide.

The foregoing specification of my elastic wheel signed by me this 15th day of July 1908.

CHARLES FRANÇOIS RENARD.

Witnesses:
H. C. COXE,
MAURICE H. PIGNET.